(12) United States Patent
Kuo

(10) Patent No.: US 9,668,324 B2
(45) Date of Patent: *May 30, 2017

(54) SOLID-STATE DRIVE

(71) Applicant: ALSON TECHNOLOGY LIMITED, Kowloon OT (HK)

(72) Inventor: Chi-Fen Kuo, Hsinchu County (TW)

(73) Assignee: Alson Technology Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,986

(22) Filed: Sep. 6, 2016

(65) Prior Publication Data
US 2016/0374181 A1  Dec. 22, 2016

Related U.S. Application Data

(62) Division of application No. 14/725,569, filed on May 29, 2015, now Pat. No. 9,512,992.

(51) Int. Cl.
*F21V 23/00* (2015.01)
*H05B 37/02* (2006.01)
*F21V 23/04* (2006.01)
*F21V 8/00* (2006.01)
*G09F 13/00* (2006.01)

(52) U.S. Cl.
CPC ....... *H05B 37/0227* (2013.01); *F21V 23/003* (2013.01); *F21V 23/0442* (2013.01); *G02B 6/006* (2013.01); *G02B 6/0075* (2013.01); *G02B 6/0083* (2013.01); *G02B 6/0093* (2013.01); *G09F 13/00* (2013.01)

(58) Field of Classification Search
CPC .... H05B 37/0227; G11C 16/04; G02B 6/006; G02B 6/0075; G02B 6/0083; G02B 6/0093; F21V 23/003
See application file for complete search history.

(56) References Cited

U.S. PATENT DOCUMENTS

2008/0273300 A1    11/2008  Wang

FOREIGN PATENT DOCUMENTS

TW            I437573          5/2014

*Primary Examiner* — Thomas M Sember
(74) *Attorney, Agent, or Firm* — Muncy, Geissler, Olds & Lowe, P.C.

(57) ABSTRACT

A solid-state drive is provided, including: a substrate, a flash memory module, at least one light-emitting portion and at least one light-guiding portion. The substrate has a transmit port. The flash memory module is disposed on the substrate, and the flash memory module is electrically connected with the transmit port. The at least one light-emitting portion is disposed on the substrate, and the at least one light-emitting portion is electrically connected with the transmit port. The at least one light-guiding portion at least partially covers the at least one light-emitting portion.

8 Claims, 4 Drawing Sheets

SOLID-STATE DRIVE

This application is a continuation of co-pending application Ser. No. 14/725,569, filed on May 29, 2015, for which priority is claimed under 35 U.S.C. §120; the entire contents of all of which are hereby incorporated by reference.

BACKGROUND OF THE INVENTION

Field of the Invention

The present invention relates to a solid-state drive (SSD).

Description of the Prior Art

A conventional solid-state drive as disclosed in TWI437573 has a circuit board, a plurality of flash memory cells and an add-in connector. The plurality of flash memory cells are disposed on the circuit board, and the add-in connector is disposed on an edge of the circuit board.

However, when the conventional solid-state drive is in actual practice, a user is unable to know a state of the solid-state drive from an appearance of the solid-state drive if any circumstance (for example, overheating) takes place. Therefore, if the circumstance happens continuously, a service life of the solid-state drive will be shorter.

US2008/0273300 discloses a sell has no light-transmittable portion corresponding to the light-guiding portion which covers the light-emitting portion disposed on the substrate and electrically connected with the transmit port.

The present invention has arisen to mitigate and/or obviate the afore-described disadvantages.

SUMMARY OF THE INVENTION

The major object of the present invention is to provide a solid-state drive which allows a user to know a state of the solid-state drive via a light-emitting mode of a light-emitting portion to decrease the possibility of the solid-state drive being damaged.

To achieve the above and other objects, a solid-state drive is provided, including: a substrate, a flash memory module, at least one light-emitting portion and at least one light-guiding portion. The substrate has a transmit port. The flash memory module is disposed on the substrate, and the flash memory module is electrically connected with the transmit port. The at least one light-emitting portion is disposed on the substrate, and the at least one light-emitting portion is electrically connected with the transmit port. The at least one light-guiding portion at least partially covers the at least one light-emitting portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
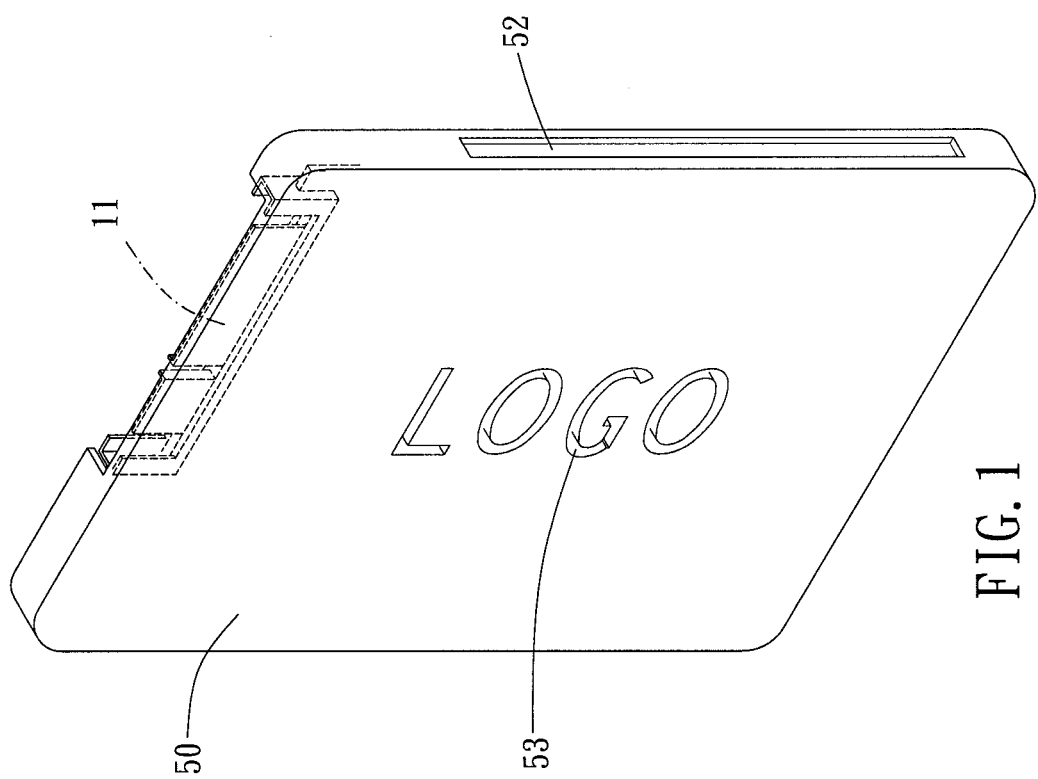
FIG. 1 is a perspective drawing of a preferred embodiment of the present invention.
Figure 2:
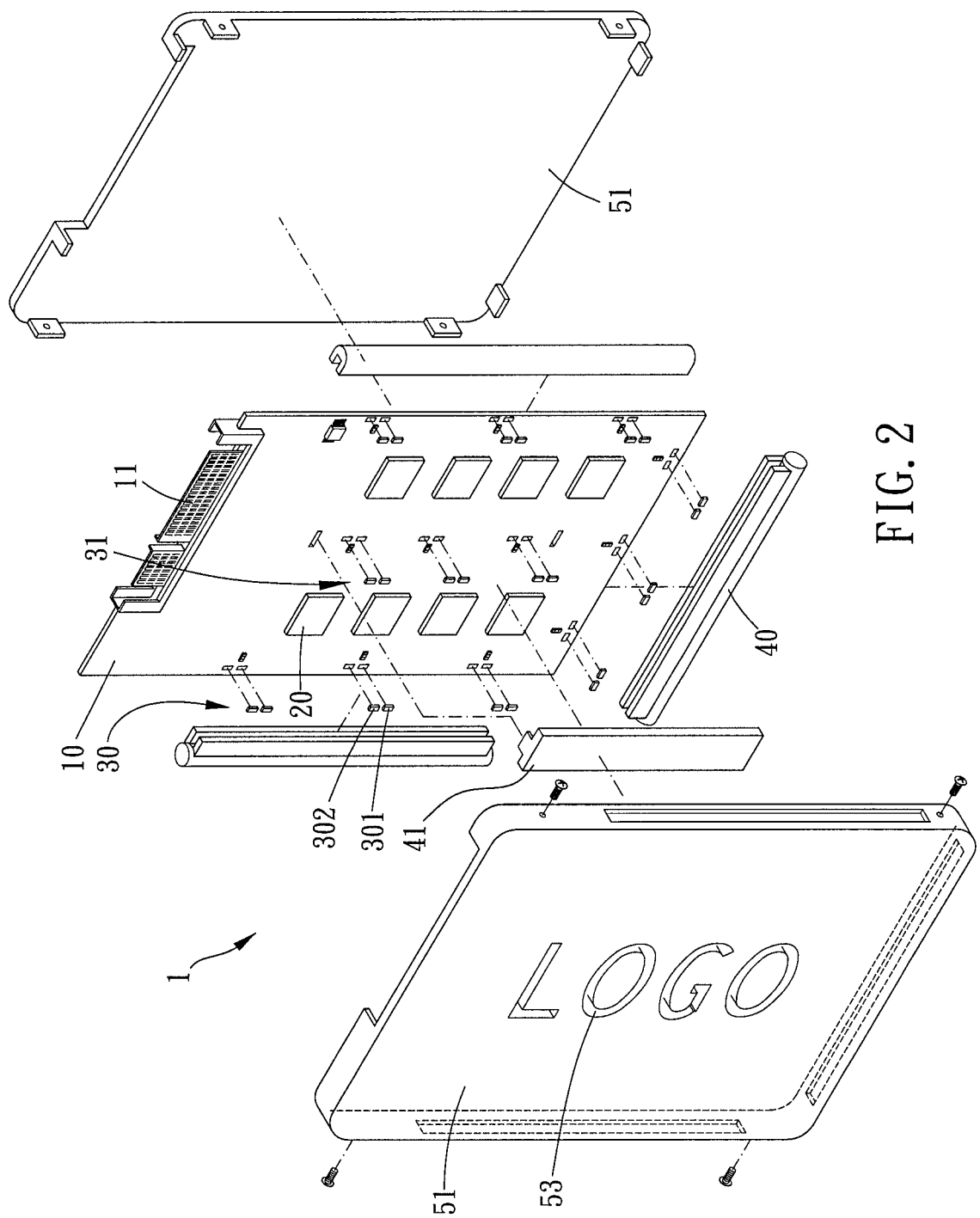
FIG. 2 is a breakdown drawing of the preferred embodiment of the present invention.
Figure 3:
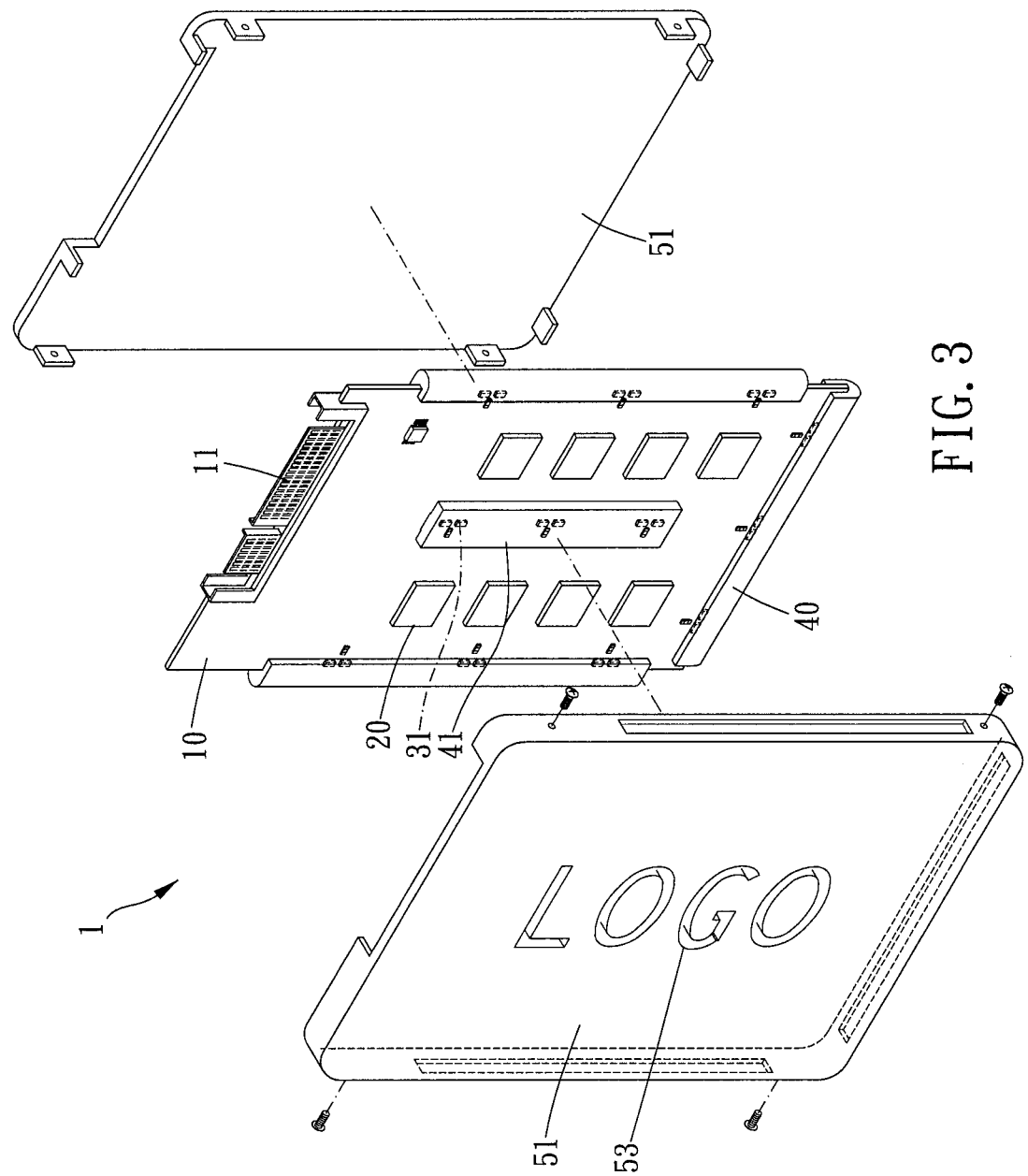
FIG. 3 is another breakdown drawing of the preferred embodiment of the present invention.
Figure 4:
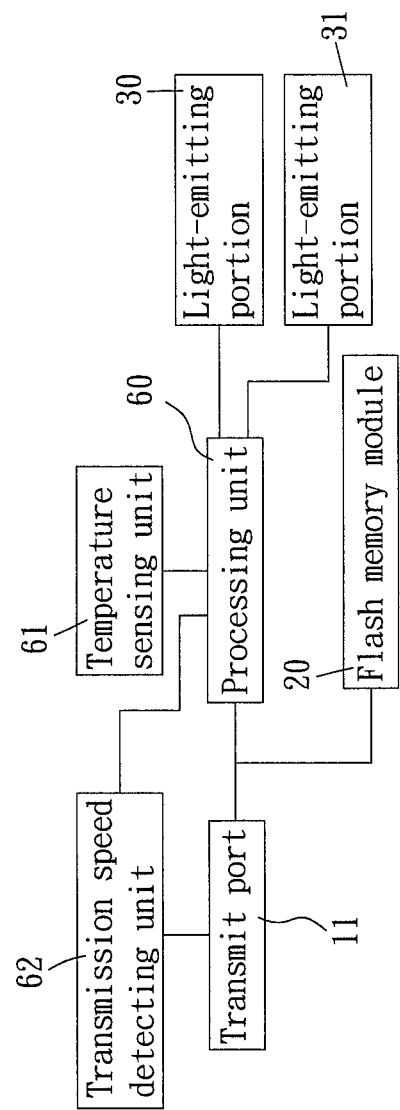
FIG. 4 is a block diagram showing structural relations of elements according to the preferred embodiment of the present invention.

Please refer to FIGS. 1 to 4 for a preferred embodiment of a solid-state drive 1 of the present invention. The solid-state drive 1 includes a substrate 10, a flash memory module 20, at least one light-emitting portion and at least one light-guiding portion. More specifically, the solid-state drive 1 includes the substrate 10, the flash memory module 20, two the light-emitting portions 30, 31 and two the light-guiding portions 40, 41.

The substrate 10 has a transmit port 11. More specifically, the transmit port 11 may be a port for SATA (serial advanced technology attachment) or IDE (integrated development environment) in accordance with various scales of inserting slots of main boards. Of course, the transmit port 11 may be a port for USB (universal serial bus) so that the solid-state drive is portable.

The flash memory module 20 is disposed on the substrate 10, and the flash memory module 20 is electrically connected with the transmit port 11. Compared with a memory cell of a conventional hard drive, a transmission speed of the flash memory module 20 is higher, and the solid-state drive is noiseless.

The at least one light-emitting portion is disposed on the substrate 10, and the at least one light-emitting portion is electrically connected with the transmit portion 11. The at least one light-guiding portion at least partially covers the at least one light-emitting portion. Preferably, the at least one light-guiding portion is translucent, and the at least one light-guiding portion can prevent a light emitted from the light-emitting portion from being emitted out directly and hurting human eyes. The light is softer after being reflected and absorbed by the at least one light-guiding portion.

In this embodiment, one of the light-emitting portions 30 is disposed on a circumferential side of the substrate 10, and the light-guiding portion 40 covers the light-emitting portion 30. The solid-state drive 1 further has a shell portion 50, and the shell portion 50 includes two shell members 51. The two shell members 51 cover two opposite side faces of the substrate 10 substantially perpendicular to a thickness direction thereof, and a light-transmittable portion 52 is formed on a circumferential side of the shell portion 50. The light-guiding portion 40 is disposed between the two shell members 51 and corresponds to the light-transmittable portion 52.

In this embodiment, the other light-emitting portion 31 is disposed at a center of one the side face of the substrate 10 substantially perpendicular to in a thickness direction thereof, and the light-guiding portion 41 covers the light-emitting portion 31. In addition, the shell portion 50 covers the two side faces of the substrate 10, and the shell portion 50 is formed with a light-transmittable portion 53 which corresponds to the light-guiding portion 41. Specifically, the light-transmittable portion 53 is a hollow portion having pictures and texts thereon (for example, trademarks), and the light from the light-guiding portion 41 projects through the light-transmittable portion 53 to show a picture-text effect. In other embodiments, the light-transmittable portion may be a light-transmittable glass to protect the light-guiding portion and prevent dust from outside from entering the solid-state drive 1. Therefore, the light projecting through a center and circumferential sides of the solid-state drive 1 makes the solid-state drive 1 more eye-catching, and the user can recognize, from expression of the light, a state of the solid-state drive 1.

In order to allow the solid-state drive 1 to have various light-emitting modes, the substrate 10 further includes a processing unit 60. The processing unit 60 is electrically connected with the light-emitting portion 30 and able to control the light-emitting portion 30 (following is a description with the light-emitting portion 30 as an example, but the light-emitting portion 30 may be the light-emitting portion 31 as well).

Furthermore, the processing unit 60 is electrically connected with a temperature sensing unit 61, and the temperature sensing unit 61 can sense a temperature of at least one of the substrate 10, the flash memory module 20 and the light-emitting portion 30 to produce a sensing signal. The processing unit 60 is able to control the light-emitting portion 30 (for example, a color or a frequency of light) according to the sensing signal. Specifically, the light-emitting portion 30 includes a first light-emitting module 301 which is capable of emitting a first color and a second light-emitting module 302 which is capable of emitting a second color, and the first and second colors are different. In this embodiment, the first color is blue, and the second color is red. The processing unit 60 is able to control at least one of the first light-emitting module 301 and the second light-emitting module 302 to be electrically communicable or incommunicable with the transmit port 11. More specifically, when the temperature sensing unit 61 senses a relatively lower temperature, the first light-emitting module 301 is electrically communicable with the transmit port 11, and the second light-emitting module 302 is electrically incommunicable with the transmit port 11 to make the light-guiding portion 40 emit a blue light; on the contrary, when the processing unit 61 senses a relatively higher temperature, the first light-emitting module 301 is electrically incommunicable with the transmit port 11, and the second light-emitting module 302 is electrically communicable with the transmit port 11 to make the light-guiding portion 40 emit a red light. It is understandable that the processing unit 60 may be able to control the first light-emitting module 301 and the second light-emitting module 302 to emit stronger or weaker lights respectively so that the light-guiding portion 40 may have various light-emitting modes.

In this embodiment, the solid-state drive 1 further includes a transmission speed detecting unit 62, and the transmission speed detecting unit 62 is electrically connected with the processing unit 60 and the transmit port 11. The transmission speed detecting unit 62 is able to detect a transmission speed of the transmit port 11 to produce a detecting signal, and the processing unit 60 is able to control the light-emitting mode of the light-emitting portion 30 according to the detecting signal. Specifically, when the transmission speed of the transmit port 11 is faster, the processing unit 60 is able to control the light-emitting portion 30 to flicker in a high frequency; on the contrary, when the transmission speed of the transmit port 11 is slower, the processing unit 60 is able to control the light-emitting portion 30 to flicker in a low frequency. Therefore, the user may know if there are any abnormal situations in the solid-state drive 1 through shining modes of the light-emitting portion 30. It is understandable that the processing unit can control frequency of flicker via a preset program.

Given the above, the light-emitting modes (for example, changes of colors or shining) of the light-emitting portion of the solid-state drive allow the user to know the state of the solid-state drive from an appearance of the solid-state drive to prevent the solid-state drive from being damaged due to abnormal situations.

In addition, the solid-state drive further has the light-guiding portion to make the light emitted from the light-emitting portion softer so as to decrease the harm to human eyes.

While we have shown and described various embodiments in accordance with the present invention, it should be clear to those skilled in the art that further embodiments may be made without departing from the scope of the present invention.

What is claimed is:

1. A solid-state drive, including:
   a substrate, having a transmit port;
   a flash memory module, disposed on the substrate and electrically connected with the transmit port;
   at least one light-emitting portion, disposed on the substrate and electrically connected with the transmit port;
   at least one light-guiding portion, at least partially covering the light-emitting portion;
   a shell portion, the shell portion covering two side faces of the substrate, the shell portion formed with a light-transmittable portion, the light-transmittable portion corresponding to the light-guiding portion.

2. The solid-state drive of claim 1, wherein one said light-emitting portion is disposed on a circumferential side of the substrate, and one said light-guiding portion covers the light-emitting portion.

3. The solid-state drive of claim 2, further having a shell portion, the shell portion including two shell members, the two shell members covering two side faces of the substrate substantially perpendicular to a thickness direction thereof respectively, a circumferential side of the shell portion being formed with a light-transmittable portion, the light-guiding portion being disposed between the two shell members and corresponding to the light-transmittable portion.

4. The solid-state drive of claim 1, wherein the substrate further includes a processing unit, and the processing unit is electrically connected with the light-emitting portion and able to control the light-emitting portion.

5. The solid-state drive of claim 4, wherein the processing unit is electrically connected with a temperature sensing unit, the temperature sensing unit senses a temperature of at least one of the substrate, the flash memory module and the light-emitting portion to produce a sensing signal, and the processing unit controls the light-emitting portion according to the sensing signal.

6. The solid-state drive of claim 5, wherein the light-emitting portion includes a first light-emitting module capable of emitting a first color and a second light-emitting module capable of emitting a second color, the first and second colors are different, the processing unit is able to control at least one of the first and second light-emitting modules to be electrically communicable or incommunicable with the transmit port.

7. The solid-state drive of claim 4, further including a transmission speed detecting unit, the transmission speed detecting unit being electrically connected with the processing unit and the transmit port, the transmission speed detecting unit being able to detect a transmission speed of the transmit port to produce a detecting signal, the processing unit being able to control a light-emitting mode of the light-emitting portion according to the detecting signal.

8. The solid-state drive of claim 1, wherein the transmit port is a port for USB (universal serial bus), SATA (serial advanced technology attachment) or IDE (integrated development environment).

* * * * *